(12) United States Patent
Ito (10) Patent No.: US 9,347,495 B2
(45) Date of Patent: May 24, 2016

(54) BEARING ASSEMBLY AND BEARING SEAL HAVING RFID FUNCTION (71) Applicant: NTN CORPORATION, Osaka (JP)

(72) Inventor: Hiroyoshi Ito, Kuwana (JP)

(73) Assignee: NTN CORPORATION, Osaka (JP)

( * ) Notice: Subject to any disclaimer, the term of this patent is extended or adjusted under 35 U.S.C. 154(b) by 48 days.

(21) Appl. No.: 14/372,793

(22) PCT Filed: Jan. 15, 2013

(86) PCT No.: PCT/JP2013/050558
§ 371 (c)(1),
(2) Date: Jul. 17, 2014

(87) PCT Pub. No.: WO2013/111638
PCT Pub. Date: Aug. 1, 2013

(65) Prior Publication Data
US 2015/0036956 A1 Feb. 5, 2015

(30) Foreign Application Priority Data

Jan. 25, 2012 (JP) .................. 2012-012963

(51) Int. Cl.
*F16C 41/00* (2006.01)
*G01P 3/42* (2006.01)
(Continued)

(52) U.S. Cl.
CPC .............. *F16C 41/008* (2013.01); *F16C 19/02* (2013.01); *F16C 33/586* (2013.01); *F16C 33/76* (2013.01); *F16C 33/7853* (2013.01);
(Continued)

(58) Field of Classification Search
CPC .......... F16C 19/02; F16C 19/06; F16C 33/76; F16C 33/586; F16C 33/782; F16C 33/784; F16C 33/7853; F16C 39/06; F16C 41/008; G01P 3/443; G01P 3/487; G06K 19/07779
USPC .......... 384/446, 448, 477, 490; 324/173–174, 324/205.25, 207.25; 340/447
See application file for complete search history.

(56) References Cited

U.S. PATENT DOCUMENTS 5,026,178 A * 6/1991 Ballhaus ............... F16C 33/416
384/446
5,232,292 A * 8/1993 Stackling .............. F16C 23/086
277/375

(Continued)

FOREIGN PATENT DOCUMENTS

CN 102204516 10/2011
EP 0 652 438 A1 5/1995

(Continued)

OTHER PUBLICATIONS

International Search Report mailed Mar. 12, 2013, in International Patent Application No. PCT/JP2013/050558.

(Continued)

*Primary Examiner* — Marcus Charles (57) ABSTRACT

A bearing assembly having an RFID (radio frequency identification) function, which can implement a communication and has a capability of accomplishing information communication on a non-contact basis. This bearing assembly includes an inlet, including an IC chip and an antenna connected with such IC chip, and a magnetic sheet, both of which are embedded in overlapped relation to each other in a bearing seal for sealing a bearing space.

7 Claims, 7 Drawing Sheets

(51) Int. Cl.
*F16C 33/76* (2006.01)
*F16C 19/02* (2006.01)
*G01P 3/44* (2006.01)
*F16C 33/78* (2006.01)
*F16C 33/58* (2006.01)
*G06K 19/077* (2006.01)
*F16C 19/06* (2006.01)

(52) U.S. Cl.
CPC ........... *G01P 3/443* (2013.01); *F16C 19/06* (2013.01); *G06K 19/07779* (2013.01)

(56) References Cited

U.S. PATENT DOCUMENTS

| | | | | |
|---|---|---|---|---|
| 5,523,681 | A * | 6/1996 | Hajzler | F16C 33/78 324/174 |
| 5,898,388 | A * | 4/1999 | Hofmann | F16C 33/7879 310/168 |
| 5,986,448 | A * | 11/1999 | Yada | G01P 3/443 324/163 |
| 6,559,633 | B1 * | 5/2003 | Nachtigal | F16C 33/7879 324/174 |
| 6,918,596 | B2 * | 7/2005 | Ichiman | F16C 33/7879 277/571 |
| 7,249,891 | B2 * | 7/2007 | Aoki | F16C 33/586 384/448 |
| 7,525,430 | B2 | 4/2009 | Nakamura et al. | |
| 7,534,045 | B2 | 5/2009 | Nakajima et al. | |
| 7,963,700 | B2 * | 6/2011 | Weber | F16C 33/7876 324/160 |
| 7,971,792 | B2 * | 7/2011 | Seriu | F16C 33/7853 235/487 |
| 2006/0158181 | A1 | 7/2006 | Shoji | |
| 2006/0170551 | A1 | 8/2006 | Nakamura et al. | |
| 2007/0115131 | A1 | 5/2007 | Seriu et al. | |
| 2007/0126587 | A1 | 6/2007 | Nakajima et al. | |
| 2008/0317397 | A1 * | 12/2008 | Muranaka | B60B 27/00 384/448 |
| 2009/0046966 | A1 | 2/2009 | Weber | |
| 2010/0283208 | A1 | 11/2010 | Hering et al. | |

FOREIGN PATENT DOCUMENTS

| | | |
|---|---|---|
| EP | 1 886 048 | 2/2008 |
| GB | 1 604 862 | 12/1981 |
| JP | 2004-263724 | 9/2004 |
| JP | 2005-155735 | 6/2005 |
| JP | 2005-172153 | 6/2005 |
| JP | 2006052742 A * | 2/2006 |
| JP | 2006052767 A * | 2/2006 |
| JP | 2006-258242 | 9/2006 |
| JP | 2009-97669 | 5/2009 |
| JP | 2010-534810 | 11/2010 |
| JP | 2011-138372 | 7/2011 |
| WO | WO 2009/015648 A1 | 2/2009 |

OTHER PUBLICATIONS

PCT International Preliminary Report on Patentability mailed Aug. 7, 2014 in corresponding International Patent Application No. PCT/JP2013/050558.

European Search Report issued Nov. 5, 2015 in corresponding European Patent Application No. 13741372.0.

Chinese Office Action issued Oct. 9, 2015 in corresponding Chinese Patent Application No. 201380005134.6.

* cited by examiner

BEARING ASSEMBLY AND BEARING SEAL HAVING RFID FUNCTION

CROSS REFERENCE TO THE RELATED APPLICATION

This application is a U.S. National Stage Application of PCT/JP2013/050558, filed Jan. 15, 2013, and claims foreign priority benefit to Japanese Patent Application No. 2012-012963, filed Jan. 25, 2012, the entire disclosure of which is herein incorporated by reference as a part of this application.

BACKGROUND OF THE INVENTION

1. Field of the Invention

The present invention relates to a bearing assembly having RFID function and a bearing seal having RFID function and, more particularly, to a technique of incorporating an RFID inlet into an outer or inner ring of the bearing assembly or a bearing seal snugly and neatly.

The term "RFID" referred to hereinabove and hereinafter is intended to means "radio frequency identification".

2. Description of Related Art

Figure 11:
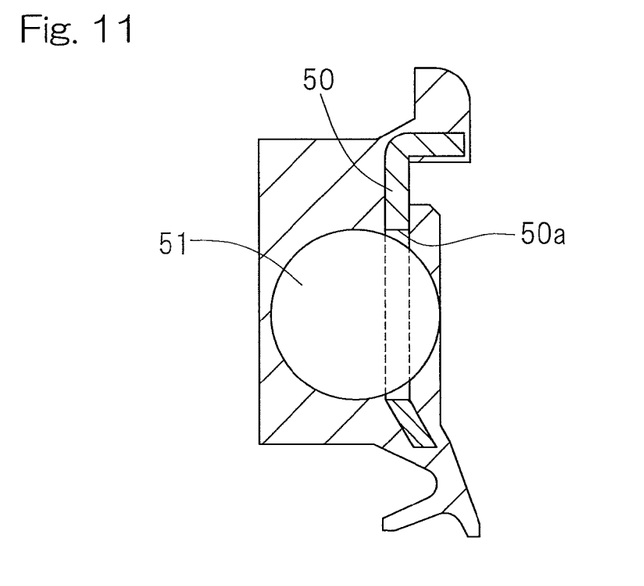
FIG. 11 is an enlarged sectional view showing the seal employed in the conventional example.

As shown in FIG. 11 of the accompanying drawings, the patent document 1 listed below suggests a technique of providing a core metal 50 of a bearing rubber seal with an opening 50a for fixture of an IC tag and then molding by vulcanization with an IC tag 51 embedded in such opening 50a.

Figure 12:
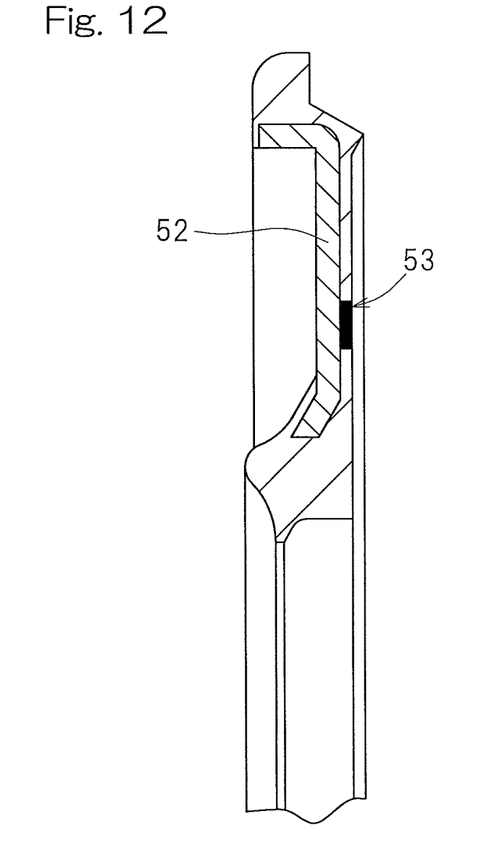
FIG. 12 is an enlarged sectional view showing the seal employed in the different conventional example.

As shown in FIG. 12 of the accompanying drawings, the patent document 2 similarly listed below suggests a technique of fitting to a bearing seal an IC tag 53 having an antenna defined by a core metal 52 of a bearing seal.

PRIOR ART LITERATURE

[Patent Document 1] JP Laid-open Patent Publication No. 2005-172153
[Patent Document 2] JP Laid-open Patent Publication No. 2005-155735

According to the technique disclosed in the patent document 1 as shown in FIG. 11, a tag shape (IC tag) incorporates the RFID inlet comprised mainly of an IC chip and an antenna, and the bearing rubber seal incorporates the tag shape (IC tag). Because of this, the IC tag equipped bearing assembly tends to have an increased widthwise dimension and protrudes considerably outwardly from a surface of the bearing rubber seal. Also, because of the tag shape, a substantial amount of labor and cost are required to built, for example, the inlet and others into a tag casing.

On the other hand, according to the technique disclosed in the patent document 2 as shown in FIG. 12, the core metal of the bearing seal is concurrently used as the antenna for the IC tag and, therefore, no communication is possible particularly in the case of an electromagnetic coupling system or an electromagnetic induction system. In general, if magnetic fields transmitted from a reader/writer which operates to write and read information in and from the IC tag, respectively, transmit through a metallic surface of the core metal, eddy currents are generated within the inside. Since those eddy current in turn result in generation of magnetic fields developed in the opposite direction of the transmitted magnetic fields, a normal communication is disturbed. Also, even in the case of a radio wave system, it may occur that no good communication can be accomplished, depending on the dimensions and/or the shape of the core metal.

SUMMARY OF THE INVENTION

In view of the foregoing, the present invention has for its primary object to provide a bearing assembly and a bearing seal each having an RFID function, both of which contribute to reduction in the labor and cost, which would be incurred during the course of compactization, and contributes to implementation of a good communication.

In order to accomplish the foregoing object, the present invention provides a bearing assembly having an RFID function, with which an information communication can be accomplished on a non-contact basis. In this bearing assembly having the RFID function, an inlet, which includes an IC chip and an antenna connected with this IC chip, and a magnetic sheet are embedded in a bearing seal, used to seal a bearing space, or in a raceway ring in overlapped relation to each other.

The magnetic sheet referred to above is used to avoid an electromagnetic induction to a metal surface.

According to the present invention, since the inlet and the magnetic sheet are provided having been embedded in the bearing seal or the raceway ring in overlapped relation to each other, the RFID bearing assembly in its entirety can be expected to be compactized as compared with, for example, the type having the IC tag built in the bearing seal. Not since the inlet and others are built in a tag casing, but since the inlet and the magnetic sheet are directly embedded in the bearing seal or the raceway ring, the labor and cost required in, for example, building the inlet and others into the tag casing can be expected to be reduced. Also, the interposition of the magnetic sheet is effective to avoid in advance the possibility of occurrence of an electromagnetic induction in metal surfaces of the raceway rings or the bearing seal at the time of writing or reading information in or from the IC tip 16. Accordingly, a good communication can be accomplished between the inlet and the reader/writer.

The antenna referred to above may be a coil wound on a flat surface shape or a wire wound around a ferrite core. Where the coil wound on the flat surface shape is adopted as the antenna, thinning of the antenna can be accomplished, and compactization of the bearing assembly as a whole can be expected to be accomplished as compared with the conventional tag shape (IC tag) and the wire wound around the ferrite core as the antenna. By way of example, in the structure in which the inlet and the magnetic sheet are provided having been embedded in the raceway ring, where as the antenna the wire wound around the ferrite core is adopted, a recess provided in the raceway ring can be downsized as compared with the conventional tag shape (IC tag) or the like. Accordingly, influences on the bearing strength (strength of the bearing assembly) can be minimized.

In a preferred embodiment of the present invention, the inlet and the magnetic sheet may be provided having been embedded in the bearing seal, in which case the bearing seal is that in which rubber is bonded by vulcanization to a core metal, the IC chip and the antenna and the magnetic sheet are bonded by vulcanization simultaneously with the rubber. It is to be noted that the term "simultaneously" referred to above and hereinafter should be understood as synonymous with "together". An inner side face of the magnetic sheet adjacent the bearing space may be disposed in contact with or in the vicinity of the core metal in the bearing seal whereas the inlet is disposed on an outer side face of the magnetic sheet. In those cases, a step of fixing the inlet to the bearing seal and a step of bonding the rubber by vulcanization to the core metal can be accomplished simultaneously and, therefore, the number of making steps can be reduced enough to reduce the manufacturing cost.

The inlet and the magnetic sheet may be provided having been embedded in the raceway ring, in which case a recess is provided in an end face or a peripheral surface of the raceway ring with the inlet and the magnetic sheet provided in this recess. One side face of the magnetic sheet may be disposed at a bottom portion of the recess in the raceway ring, in which case the inlet is disposed on the other side face of the magnetic sheet. Also, the inlet and the magnetic sheet may be provided having been inserted into the recess in the raceway ring while an opening of the recess is sealed by an elastic material or a thermosetting resin. In those cases, since the inlet and the magnetic sheet are directly embedded in the raceway ring, the recess dimension can be reduced as compared with, for example, the case in which the inlet and others built in the tag casing is embedded in the raceway ring. Accordingly, influences on the bearing strength can be reduced.

The IC chip and the antenna, both referred to above, may be formed having been mounted on a single thin plate shaped member and the magnetic sheet is pasted to a surface of the thin plate shaped member opposite to a mounting surface. Where the IC chip or the antenna is small, mounting of them on the thin plate shaped member is effective to enhance the handling capability during the assemblage enough to make it possible to easily handle.

The IC chip referred to above may be provided with a memory to record information, related to manufacture or testing of the bearing assembly, and inspection information or operating information of an apparatus, which inspection or operating is performed after the bearing assembly has been incorporated in the apparatus. In this case, in a condition with the bearing assembly incorporated in the apparatus, various information can be easily read out from the memory.

The present invention also provides a bearing seal fitted to a bearing assembly to seal a bearing space delimited between raceway rings of such bearing assembly, which seal is characterized by including a core metal, an elastic body covering the core metal, an inlet having an IC chip and an antenna connected with the IC chip, and a magnetic sheet; the inlet and the magnetic sheet being embedded in the elastic body in overlapped relation to each other. According to this bearing seal of the structure described above, the bearing seal can be expected to be compactized as compared with, for example, the type having an IC tag built in the bearing seal. Not since the inlet and others are built in a tag casing, but since the inlet and the magnetic sheet are directly embedded in the elastic body of the bearing seal, the labor and cost required in, for example, building the inlet and others into the tag casing can be expected to be reduced. Also, the interposition of the magnetic sheet is effective to avoid in advance the possibility of occurrence of an electromagnetic induction in a metal surface of the core metal at the time of writing or reading information in or from the IC tip. Accordingly, a good communication can be accomplished between the inlet and the reader/writer.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A bearing assembly having a radio frequency identification (RFID) function, which is designed in accordance with a first preferred embodiment of the present invention, will be described in detail with particular reference to FIGS. 1A and 1B to FIG. 5, noting that in the description that follows, description of both of a bearing seal and a method of making the same is connoted.

Figure 1A:
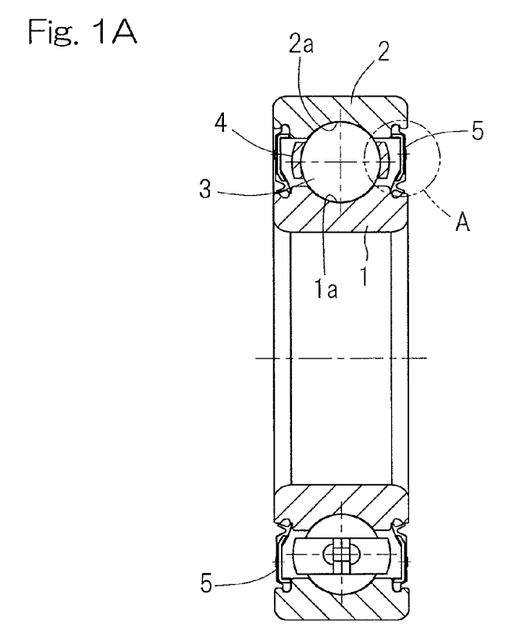
FIG. 1A is a longitudinal sectional view showing a bearing assembly of a type having an RFID function, which assembly is designed in accordance with a preferred embodiment of the present invention.

The bearing assembly having the RFID function, or the RFID bearing assembly for short, is of a type in which as shown in FIG. 1A, a bearing seal 5 mounted inside a rolling bearing assembly has an inlet and a magnetic sheet, both described in detail later, embedded therein by means of an insert molding technique. This RFID bearing assembly includes inner and outer rings 1 and 2, which are raceway rings and define an annular bearing space therebetween, a plurality of rolling elements interposed between respective raceway surfaces 1a and 2a defined in the inner and outer rings 1 and 2, a retainer 4 for retaining those rolling elements in a circular row and equidistantly spaced relation with each other in a circumferential direction, and bearing seals 5 and 6 for closing opposite annular ends of the bearing space. The rolling elements 3 are in the form of balls and the bearing assembly is therefore rendered to be a deep groove ball bearing. It is, however, to be noted that the present invention is not necessarily limited to the deep groove ball bearing, but can be equally applied to an angular contact ball bearing or the like.

Figure 1B:
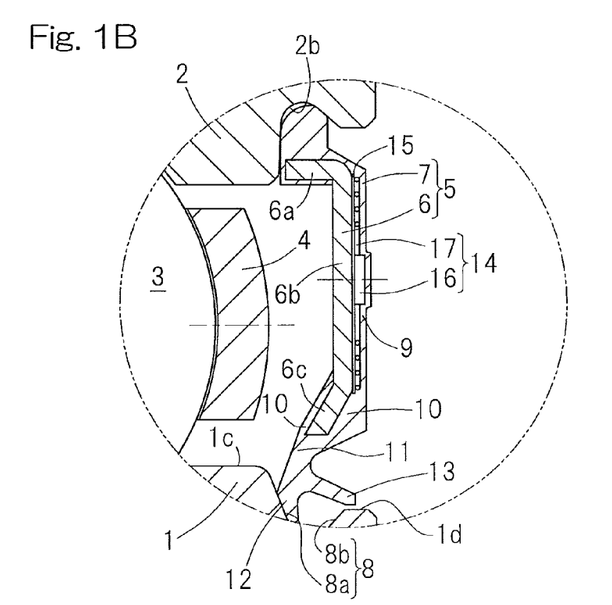
FIG. 1B is a fragmentary longitudinal sectional view showing, on an enlarged scale, a portion of the bearing assembly encompassed by the circle A in FIG. 1A.

The bearing seals 5 and 5, which in the instance as shown are of the same construction, are provided on opposite ends of the bearing assembly in symmetrical relation to each other and, therefore, only one of those bearing seals 5 will be referred to in the following description, noting that the details of the other of the bearing seals will not be reiterated for the sake of brevity. The bearing seal 5 is adapted in the form of a contact type seal and includes, as shown in FIG. 1B showing, on an enlarged scale, a portion of the bearing assembly encompassed by the circle A in FIG. 1A, a core metal 6 and an elastic body 7 made of a rubber material or a synthetic resin and enclosing the core metal 6. As the bearing seal 5 in the instance as shown, a rubber seal is adopted which is formed by bonding a rubber material, such as, for example, nitrile rubber (NBR) by vulcanization to the core metal 6.

Opposite end portions of an inner peripheral surface of the outer ring 2 are formed with outer ring seal grooves 2b each for receiving the bearing seal 5 engaged therein as best shown in FIG. 1B. Specifically, an outer peripheral edge portion of the respective bearing seal 5 is fitted having been engaged in the corresponding outer ring seal groove 2b. On the other hand, opposite end portions of an outer peripheral surface of the inner ring 1 are formed with respective inner ring seal grooves 8 each defined at a location aligned with an inner peripheral part of the corresponding bearing seal 5 as best shown in FIG. 1B.

The inner ring seal groove 8 in the inner ring 2 is in the form of a generally V-sectioned groove made up of, to describe in the order from inside of the bearing assembly towards an axially outside, an inner inclined face 8a, a groove bottom face (not shown) and an outer inclined face 8b, those faces cooperating to render the inner ring seal groove 8 to represent the generally V-sectioned groove. The inner inclined face 8a is continued to an inner ring outer diametric surface and the groove bottom face and, as it goes from an outer diametric side towards an inner diametric side, the inner inclined face 8a is so formed as to have a sectional shape inclined towards the axially outer side. It is the inner inclined face 8a with which a sealing lip part as will be described later contacts in an axial direction. On the other hand, the outer inclined face 8b is continued to the groove bottom face and is so formed as to have a sectional shape inclined towards the axially outer side as it goes from the inner diametric side towards the outer diametric side.

The core metal 6 in the bearing seal 5 has a cylindrical part 6a, an upright part 6b and an inclined part 6c, to describe in the order sequentially from the outer diametric side. The upright part 6b is disposed generally parallel to respective end faces of the inner and outer rings 1 and 2 on an axially inner side beyond the end faces of the inner and outer rings 1 and 2. This upright part 6b has a base end to which the cylindrical part 6a is continued, and the upright part 6b and the cylindrical part 6a cooperate with each other to form an L-sectioned shape. An outer peripheral edge part of the bearing seal 5, which is defined by the cylindrical part 6a and a portion of the elastic body 7, provided in the outer peripheral surface of the cylindrical part 6a, is fixedly engaged in the outer ring seal groove 2b. The upright part 6b has a tip end continued to an inclined part 6c inclined towards the axially inner side as it goes towards the inner diametric side.

An outer surface of the upright part 6b in the core metal 6 is covered by a covering part 9 of a thin walled shape and inner and outer surfaces of the inclined part 6c in the core metal 6 is covered by a covering part 10. An inner diametric side tip end of the covering part 10 is provided with sealing lip parts 12 and 13 in a forked fashion through a connecting part 11. The covering part 10, the connecting part 11 and the sealing lip parts 12 and 13 form respective part of the elastic body 7.

One of the sealing lip parts 12 and 13, that is, the sealing lip part 12 is axially inwardly inclined as it goes towards the inner diametric side and this sealing lip part 12 is held in axially contact with an inner inclined face 8a. On the other hand, the other of the sealing lip parts 12 and 13, that is, the sealing lip part 13 is axially outwardly inclined as it goes towards the inner diametric side and this tip end part is opposed to an inner ring shoulder diameter 1d through a gap.

The details of the inlet and the magnetic sheet referred to above will now be described.

Figure 2:
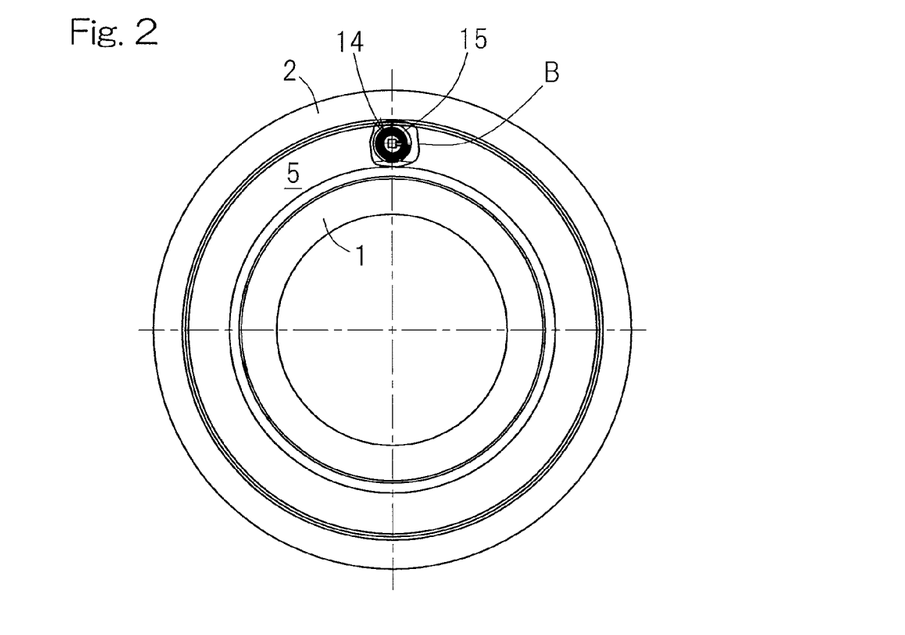
FIG. 2 is a side view showing the bearing assembly of the type referred to above.

FIG. 2 illustrates one side view of the RFID bearing assembly, and the inlet and others are shown in a portion encircled by the circle B in FIG. 2 as cut away. The inlet 14 and the magnetic sheet 15 are provided at one location of the bearing seal 5 in a circumferential direction thereof. The inlet 14 and the magnetic sheet 15 are, as best shown in FIG. 1B, embedded in the covering part 9 in overlapped relation to each other. An inner side surface of the magnetic sheet 15 adjacent the bearing space is disposed at a position adjacent the core metal 6 within the bearing seal 5, particularly at a position contacting or adjacent to an outer surface of the upright part 6b, with the inlet 14 arranged on an outer side surface of the magnetic sheet 15. For the magnetic sheet 15, ferrite is generally employed and is formed to a thin sheet shape. This magnetic sheet 15 is used to avoid the electromagnetic induction to a metal surface and achieves both of a high permeability and a low magnetic loss at a communication frequency and what has a high communication characteristic (Q value) is used therefore. That is because, when magnetic fields are absorbed by the metal surface, or a core metal surface in this example, the normal communication is no longer implemented.

Figure 3:
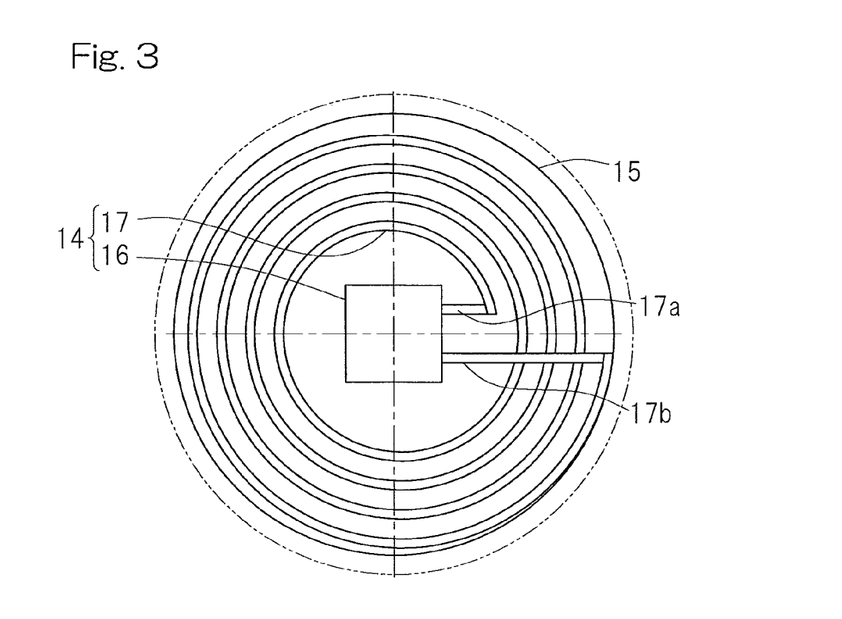
FIG. 3 is a fragmentary side view showing, on an enlarged scale, a portion of the bearing assembly encompassed by the circle B in FIG. 2.

FIG. 3 illustrates, on an enlarged scale, that portion encompassed by the circle B in FIG. 2. As shown in FIG. 3, the inlet 14 includes an IC chip 16 and an antenna 17 connected with this IC chip 16. For the IC chip 16, any of I-CODE-SLI, Mifare, Tag-it, FRAM(registered trademark) and My-d, for example, can be adopted, but it may not be necessarily limited thereto. The antenna 17 referred to above is an enameled wire wound in a flat and eddy shape to form a coil which is generally referred to as coil antenna. It is to be noted that the coil antenna formed by an electroconductive material on a substrate by means of an etching technique may also be employed for the antenna 17. The IC chip 16 referred to previously is disposed within a center space of the coil antenna 17. Opposite ends 17a and 17b of the coil antenna 17 are electrically connected with the IC chip 16.

Figure 4:
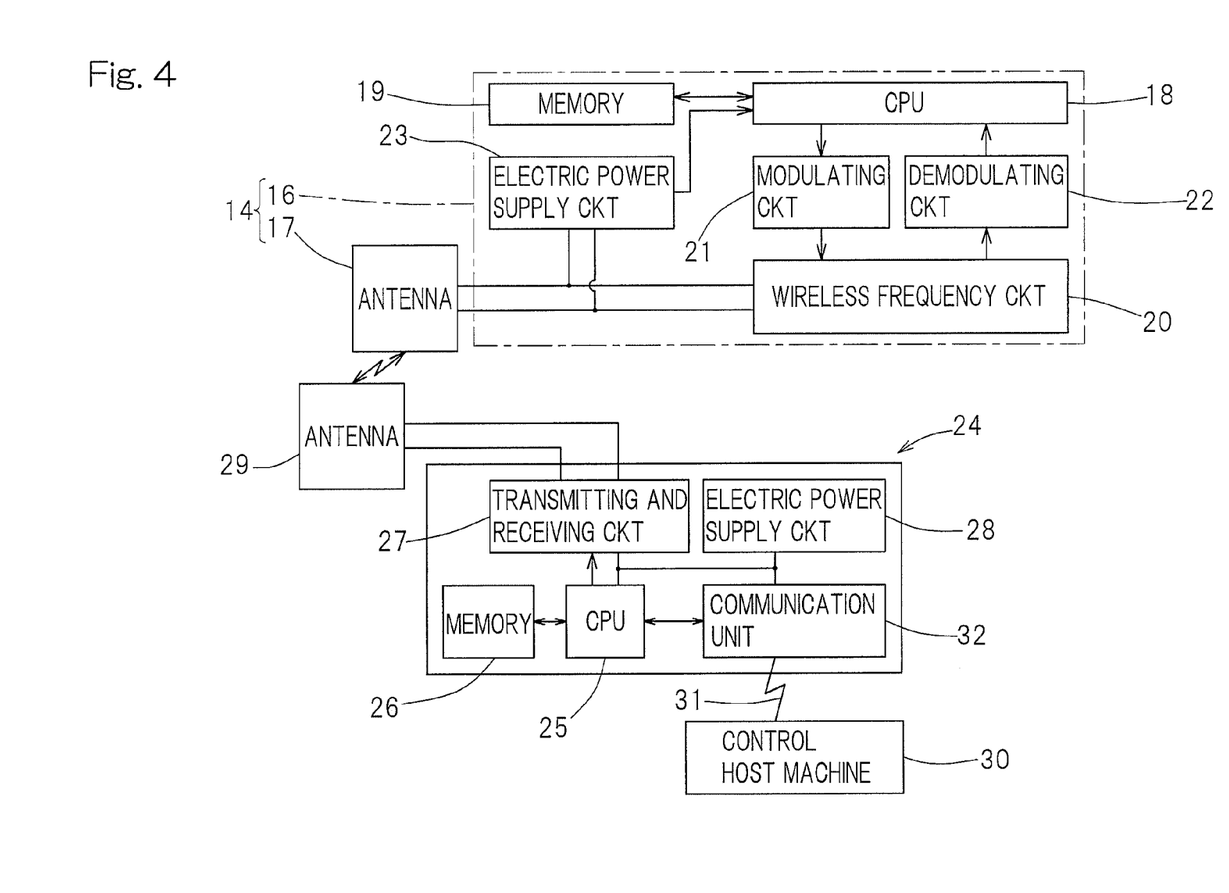
FIG. 4 is a block diagram showing an example of circuit construction of, for example, an inlet employed in the bearing assembly of the type referred to above.

FIG. 4 is a block diagram showing an exemplary circuit construction of the inlet and others employed in the bearing assembly now under discussion. The IC chip 16 in the inlet 14 includes a central processing unit (CPU) 18, a memory 19, a wireless frequency circuit 20, a modulating circuit 21, a demodulating circuit 22, and an electric power supply circuit 23. The electric power supply circuit 23 is electrically connected with the antenna 17 and acquires an electric power from this antenna 17. The electric power supply circuit 23 is used to drive the central processing unit 18. The memory 19 is used in the form of a type that does not require any electric power in accomplishing recording of information. This memory 19 stores therein information, which is related to the manufacture or the test conducted, and inspection information or operating information which is related to an apparatus not shown and which information or operating is performed after the bearing assembly has been incorporated in the apparatus.

A wireless frequency received from the antenna 17 is supplied to the demodulating circuit 22 through the wireless frequency circuit 20 and is then demodulated by the demodulating circuit 22. The central processing unit 18 causes the memory 19 to store various sorts of information so demodulated. This central processing unit 18 is so configured and so designed as to read out information from the memory 19 and allows the modulating circuit 21 to modulate the information so read out and then to transmit the modulated information from the antenna 17 to a reader/writer 24, as will be described later.

The reader/writer 24 is of a type capable of transmitting information (signal) to the IC chip 16 in the inlet 14 on a non-contact basis and also supplying an electric power thereto. This reader/writer 24 includes a CPU 25, a memory 26, a transmitting and receiving circuit 27 and an electric power supply circuit 28. The CPU 25 transmits and receive signals to and from the IC chip 16 through the antenna 29 and the transmitting and receiving circuit 27. The communication frequency at which this transmission and receipt is, for example, 13.56 MHz (electromagnetic induction and electromagnetic coupling), but it is not necessarily limited thereto and any suitable frequency can be employed. Such suitable frequency for the communication frequency includes 2.45 GHz (microwave communication) and 860 to 960 MHz (UHF communication). It is, however, to be noted that in the case of the use of such suitable frequency, the shape of the antenna 17 is different from that shown and described in connection with the preferred embodiment now under discussion. In other word, in the case of the magnetic induction and the magnetic coupling, a coil antenna is employed, but in the case of the microwave communication and UHF communication, a dipole antenna (a linear antenna) is employed.

The reader/writer 24 referred to above also includes a communication unit 32 that is connected through a communication path 31 with a host computer which becomes a control host machine 30. The communication path 31 may be comprised of either a cable or a wireless communication line, or a local area network, the internet, or any other wide area network. Where, for example, a plurality of rolling bearing assemblies are incorporated in the apparatus, information, which is related to the manufacture or inspection of each of those bearing assemblies, inspection information and operating information of the apparatus, for example, are outputted to the control host machine 30 so that they can be controlled by such control host machine 30.

By bringing the reader/writer 24 close to a desired bearing assembly to be inspected or tested, the electric power is supplied to the electric power supply circuit 23 of the IC chip 16 in the inlet 14 and, at the same time, depending on an input or output manipulation on the reader/writer 24, the information is read out from the memory 19 or is written in the memory 19. In this case, various information can be easily read out from or written in the memory 19 while the bearing assembly is in a condition having been incorporated in the apparatus.

Figure 5:
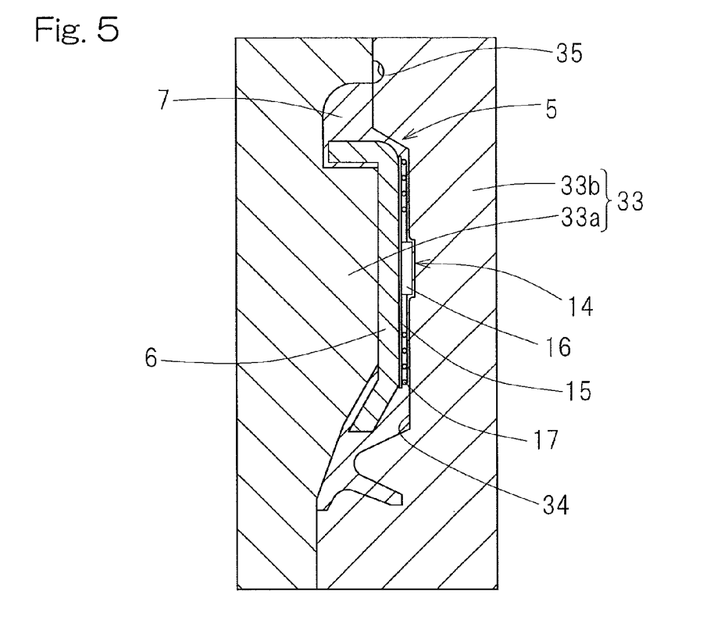
FIG. 5 is a schematic sectional view showing a seal forming mold assembly used to manufacture a bearing seal employed in the bearing assembly of the type referred to above.

FIG. 5 illustrates a sectional view of a seal forming mold assembly 33 used to manufacture the bearing seal 5. The seal forming mold assembly 33 includes two molds 33a and 33b that can be mated together. Of them the mold 33a has defined therein an annular cavity portion for molding an inner surface side portion of the seal 5 and, on the other hand, the mold 33b has defined therein an annular cavity portion for molding an outer surface side portion of the seal 5. In a condition with those two molds 33a and 33b mated together, a cavity 34 for molding the seal 5 is formed in the mold assembly 33. A gate 35 through which a material for the elastic body 7 is injected into the cavity 34 is defined in the vicinity of, for example, an outer peripheral surface portion of the cavity 34.

The core metal 6, the magnetic sheet 15 and the inlet 14 are disposed in overlapped relation to each other within the cavity 34 of the seal forming mold assembly 33. Then, the material for the elastic body 7 is injected into the cavity 34 through the gate 35 to allow the inlet 14 and the magnetic sheet 15 to be bonded by vulcanization to the elastic body 7 simultaneously. By so doing, the inlet 14, including the IC chip 16 and the antenna 17, and the magnetic sheet 15 are embedded in the bearing seal 5 in overlapped relation. Thereafter, the molds 33a and 33b are parted from each other, followed by the removal of the bearing seal 5 from the seal forming mold assembly 33.

The function and effects of the present invention will now be described.

According to the construction described above, since the inlet 14 and the magnetic sheet 15 are provided having been embedded in the bearing seal 5 in overlapped relation to each other, the bearing assembly in its entirety can be expected to be compactized as compared with, for example, the type having the IC tag built in the bearing seal. Not since the inlet and others are built in a tag casing, but since the inlet 14 and the magnetic sheet 15 are directly embedded in the bearing seal 5, the labor and cost required in, for example, building the inlet and others into the tag casing can be expected to be reduced. Also, the interposition of the magnetic sheet 15 is effective to avoid in advance the possibility of occurrence of an electromagnetic induction in metal surfaces of the bearing seal 5 and the inner and outer raceway rings 1 and 2 at the time of writing or reading information in or from the IC tip 16. Accordingly, a good communication can be accomplished between the inlet 14 and the reader/writer 24.

Since the coil wound in a planar shape is adopted as the antenna 17, thinning of the antenna 17 can be accomplished and, as compared with the type in which the wire is wound around a ferrite core or the conventional tag shape, compactization of the bearing assembly as a whole can be further accomplished.

Since the inner side face of the magnetic sheet 15 on the side of the bearing space is disposed at a position close to the core metal 6 within the bearing seal 5 and the inlet 14 is disposed on the outer side face of the magnetic sheet 15, the step of fixing the inlet 14 to the bearing seal 5 and the step of bonding the rubber by vulcanization to the core metal 6 can be performed simultaneously. For this reason, the number of steps can be reduced and the manufacturing cost can be reduced.

Other preferred embodiments of the present invention will be described hereinafter.

In the description that follows, it is to be noted that component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments. It is also to be noted that it is possible not only to combine components specifically described in connection with each of the foregoing and following embodiments of the present invention, but also to partially combine two or more of the foregoing and following embodiments of the present invention.

Figure 6:
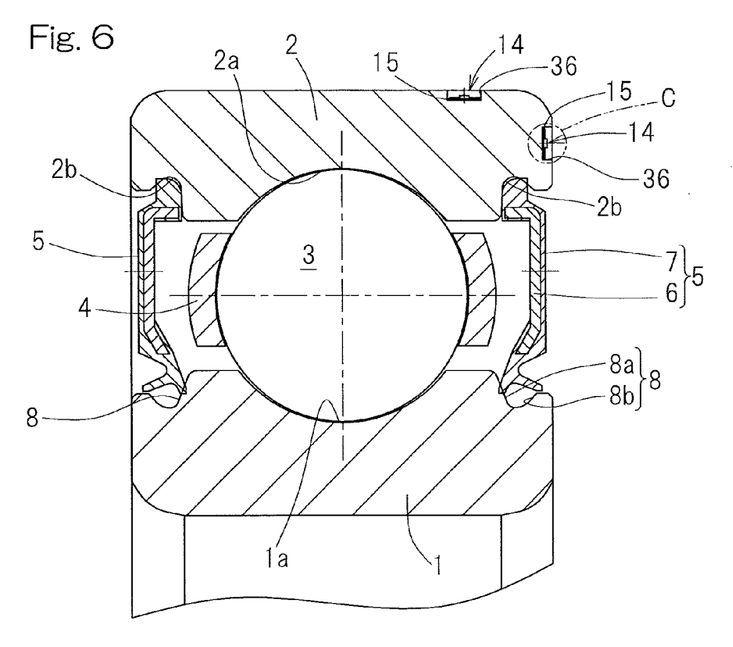
FIG. 6 is a fragmentary longitudinal sectional view showing the bearing assembly of the type referred to above, which assembly is designed in accordance with another preferred embodiment of the present invention.

As shown in FIG. 6, the inlet 14 and the magnetic sheet 15 may be provided having been embedded in the outer ring 2. It is to be noted that the bearing seal 5 shown in FIG. 6 is shown as in a natural state before being incorporated in the outer ring 2 (this applies also to FIG. 9). After the incorporation of the bearing seal 5 in the outer ring 2, the sealing lip part 12 of the bearing seal 5 contacts the inner inclined face 8a (See FIG. 1B). In this example, an end face and outer peripheral surface of the outer ring 2 are provided with respective recesses each in the form of a cylindrical blind hole and the inlet and the magnetic sheet are inserted into each of those recesses.

Figure 7:
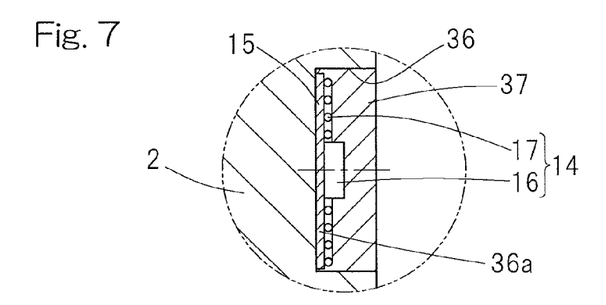
FIG. 7 is a fragmentary longitudinal sectional view showing, on an enlarged scale, a portion of the bearing assembly encompassed by the circle C in FIG. 6.

FIG. 7 is an enlarged diagram showing a portion encompassed by C in FIG. 6. As shown in FIG. 7, one side face of the magnetic sheet 15 is disposed in a bottom portion 36a of a recess 36 defined in an end face of the outer ring 2 and the inlet 14 is disposed in other side face of the magnetic sheet 15 and, further, an opening of the recess 36 is sealed by a resin or an elastic material such as, for example, rubber, to thereby fix the inlet and others. A layer of the elastic material or the resin is also called a mold layer 37. The rubber referred to above is, for example, a single fluid silicone rubber or fluoro rubber, which is filled and hardened. The resin referred to above is, for example, an urethane resin or an epoxy resin of a thermosetting type or a room temperature setting type, which is filled and hardened. It is, however, to be noted that they are not necessarily limited thereto. It is also to be noted that in place of the structure in which the inlet and others are embedded in the outer ring 2, or together with embedding of the inlet and others in the outer ring 2, a recess 36 may be made in an end face of the inner ring 1 and the inlet 14 and the magnetic sheet 15 may be provided in this recess 36.

According to the constructions shown and described with reference to FIGS. 6 and 7, respectively, since the inlet 14 and the magnetic sheet 15 are directly embedded in the raceway ring, not accommodated within a casing and others, labor and cost incurred in building the inlet and others into the casing and others can be reduced. Also, the interposition of the magnetic sheet 15 is effective to avoid in advance the possibility of occurrence of an electromagnetic induction in a metal surface of the raceway ring at the time of writing or reading information in or from the IC tip 16. Accordingly, a good communication can be accomplished between the inlet 14 and the reader/writer.

Also, the inlet 14 and the magnetic sheet 15 are provided having been inserted directly in the raceway ring, the recess dimension can be reduced as compared with, for example, the case in which the inlet and others built in the tag casing is embedded in the raceway ring. Accordingly, influences on the bearing strength can be reduced.

Figure 8:
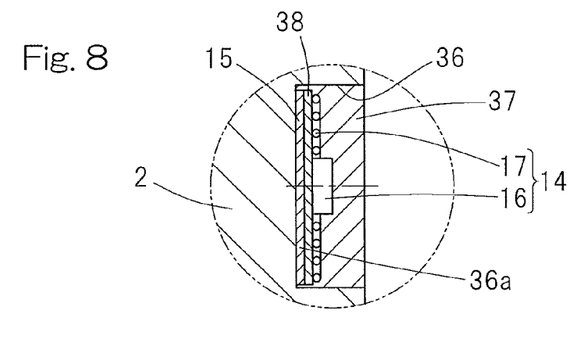
FIG. 8 is a view similar to FIG. 7, showing that portion of the bearing assembly designed in accordance with a further preferred embodiment of the present invention.

Referring to FIG. 8, the IC chip 16 and the antenna 17 may be mounted on a single thin plate shaped member 38 and the magnetic sheet 15 may be pasted to a surface of the thin plate shaped member 38 remote from a mounting surface of the thin plate shaped member 38 where the IC chip 16 and others are mounted. Also, the magnetic sheet 15 may be disposed in a bottom portion 36a of the recess 36 and an opening of the recess 36 may then be sealed by the mold layer 37. Where the IC chip 16 and the antenna 17 are small, mounting of them on the single thin plate shaped member 38 is effective to increase the handle ability during the assemblage enough to make it easy to handle.

Figure 9:
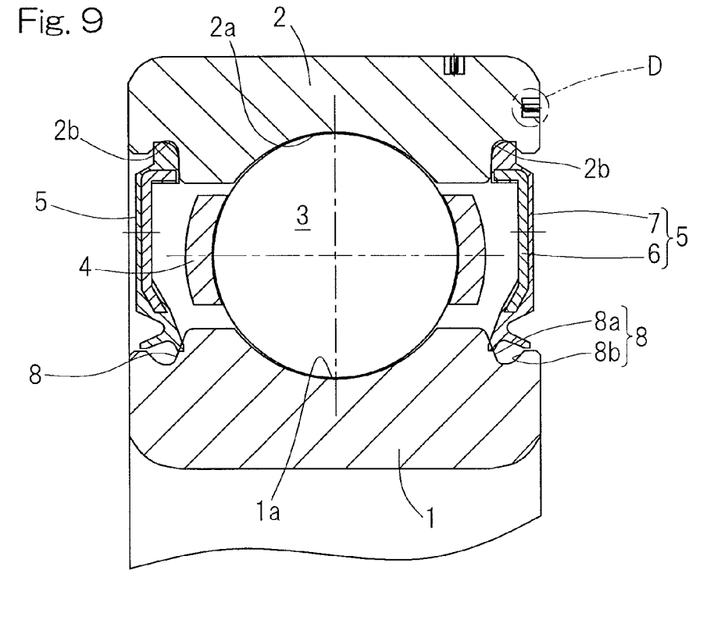
FIG. 9 is a view similar to FIG. 6, showing an important portion of the bearing assembly of the type referred to above, which assembly is designed in accordance with a still further preferred embodiment of the present invention.
Figure 10:
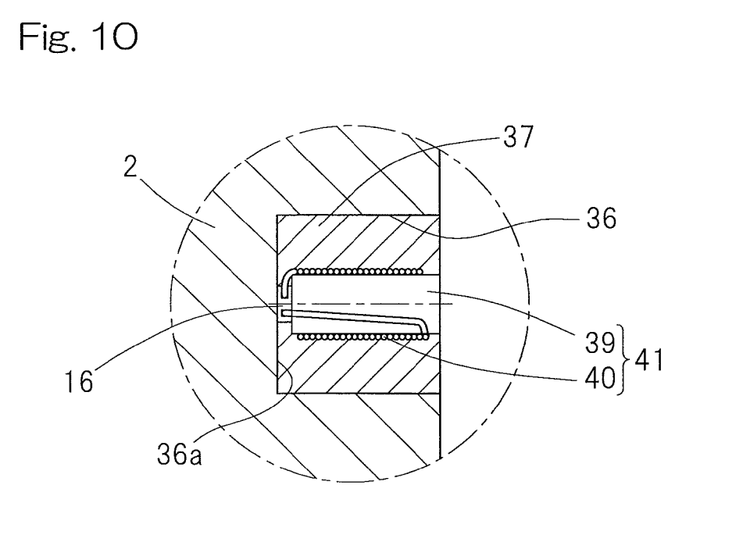
FIG. 10 is a fragmentary longitudinal view showing that portion of the bearing assembly encompassed by the circle D in FIG. 9.

As shown in FIGS. 9 and 10, arrangement may be so made that the IC chip 16 and an antenna 41, which is connected with the IC chip 16 and made up of a wire 40 wound around a ferrite core 39, is inserted into the recess 36 defined in the outer ring 2 and an annular space of the recess 36 on an outer peripheral side of the wire 40 so wound has the mold layer 37 filled therein. FIG. 10 illustrates, on an enlarged scale, that portion encompassed by the circle D in FIG. 9. The ferrite core 39 is so formed as to have a cylindrical shape and is disposed in coaxial relation with the recess 36. Also, the IC chip 16 is disposed at one end portion of the ferrite core 39 and this IC chip 16 is disposed in the bottom portion 36a of the recess 36.

According to the construction described above, since magnetic fields emanating from the reader/writer concentrate on the ferrite core 39, influences of reverse oriented magnetic fields emanating from metal become small. Also, since the IC chip 16 and the antenna 41, formed by the wire 40 wound around the ferrite core 39, are directly embedded in the raceway ring, the recess dimension can be reduced as compared with, for example, the type in which the inlet and others built in the tag casing are embedded in the raceway ring. Accordingly, influences on the bearing strength can be reduced.

It is to be noted that in the construction shown in and described with reference to FIGS. 9 and 10, the magnetic sheet 15 may be provided in the bottom portion 36a of the recess 36. In this case, owing to the magnetic sheet 15, magnetic fields, which constitute an interference, can be assuredly avoided.

In addition, the use may be made of a recess in an end face of a resin retainer of the bearing assembly and the IC chip and the antenna are inserted in this recess followed by formation of a mold layer of a kind in which a thermosetting or room temperature setting urethane or epoxy are filled and hardened. In place of this mold layer or together with this mold layer, the opening of the recess may be sealed by the use of an ultrasonic bonding technique or a hot melt technique.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
2 . . . Outer ring
5 . . . Bearing seal
6 . . . Core metal
14 . . . Inlet
15 . . . Magnetic sheet
16 . . . IC chip
17 . . . Antenna
19 . . . Memory
36 . . . Recess
38 . . . Thin plate shaped member

What is claimed is:
1. A bearing assembly having a function of radio frequency identification with which an information communication can be accomplished on a non-contact basis, comprising:
    an inlet including an IC chip and an antenna connected with the IC chip; and
    a magnetic sheet, wherein the inlet and the magnetic sheet are embedded in a bearing seal, used to seal a bearing space, and the bearing seal includes a rubber bonded by vulcanization to a core metal, the IC chip and the antenna and the magnetic sheet are bonded by vulcanization simultaneously with the rubber, and an inner side face of the magnetic sheet adjacent the bearing space is disposed in contact with or in the vicinity of the core metal in the bearing seal whereas the inlet is disposed on an outer side face of the magnetic sheet.

2. The bearing assembly as claimed in claim 1, wherein the antenna is a coil wound on a flat surface shape or a wire wound around a ferrite core.

3. The bearing assembly as claimed in claim 1, wherein the IC chip and the antenna are mounted on a single thin plate shaped member, and the magnetic sheet is pasted to a surface of the thin plate shaped member opposite to a mounting surface.

4. The bearing assembly as claimed in claim 1, wherein the IC chip is provided with a memory to record information related to manufacture or testing of the bearing assembly, and inspection information or operating information of an apparatus, and inspection or operating is performed after the bearing assembly has been incorporated in the apparatus.

5. A bearing assembly having a function of radio frequency identification with which an information communication can be accomplished on a non-contact basis, comprising:

an inlet including an IC chip and an antenna connected with the IC chip; and a magnetic sheet, wherein the inlet and the magnetic sheet are in a raceway ring in overlapped relation to each other, a recess is provided in an end face or a peripheral surface of the raceway ring, and the inlet and the magnetic sheet are provided in the recess, and one side face of the magnetic sheet is disposed at a bottom portion of the recess in the raceway ring, and the inlet is disposed on the other side face of the magnetic sheet.

6. The bearing assembly as claimed in claim 5, wherein the inlet and the magnetic sheet are configured to be inserted into the recess in the raceway ring, and an opening of the recess is sealed by an elastic material or a thermosetting resin.

7. A bearing seal fitted to a bearing assembly to seal a bearing space delimited between raceway rings of such bearing assembly, comprising:

a core metal;

an elastic body covering the core metal;

an inlet including an IC chip and an antenna connected with the IC chip; and a magnetic sheet, wherein the inlet and the magnetic sheet are embedded in the elastic body in overlapped relation to each other, the elastic body is bonded by vulcanization to the core metal, the IC chip and the antenna and the magnetic sheet are bonded by vulcanization simultaneously with the elastic body, and an inner side face of the magnetic sheet is disposed in contact with or in the vicinity of the core metal whereas the inlet is disposed on an outer side face of the magnetic sheet.

* * * * *